(12) United States Patent
Drum

(10) Patent No.: US 9,382,948 B1
(45) Date of Patent: Jul. 5, 2016

(54) ROTARY APPARATUS WITH ADAPTOR COLLAR

(71) Applicant: Deere & Company, Moline, IL (US)

(72) Inventor: Carolyn L. Drum, Raleigh, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 13/717,227

(22) Filed: Dec. 17, 2012

(51) Int. Cl.
*F16C 35/06* (2006.01)
*F16C 19/04* (2006.01)
*F16C 3/02* (2006.01)
*F16C 35/063* (2006.01)

(52) U.S. Cl.
CPC ............... *F16C 35/063* (2013.01); *F16C 3/02* (2013.01); *F16C 19/04* (2013.01); *F16C 2226/60* (2013.01); *F16C 2226/76* (2013.01)

(58) Field of Classification Search
CPC .... F16C 33/76; F16C 33/7816; F16C 33/784; F16C 33/7843; F16C 35/06; F16C 35/062; F16C 35/063; F16C 2226/76; F16C 2226/60; F16C 35/073; F16C 19/04; F16C 19/06; F16C 19/16
USPC .......................................... 384/537, 543, 513
See application file for complete search history.

(56) References Cited

U.S. PATENT DOCUMENTS

| | | | | |
|---|---|---|---|---|
| 1,561,443 A * | 11/1925 | Searles | ........................ | 384/542 |
| 1,612,465 A * | 12/1926 | Parsons | ........................ | 384/542 |
| 2,136,819 A * | 11/1938 | Large | ........................ | 384/541 |
| 2,138,659 A * | 11/1938 | Kindig | ........................ | 384/203 |
| 2,191,984 A * | 2/1940 | Dunford | ........................ | 384/541 |
| 2,686,088 A * | 8/1954 | Nelson, Jr. | ........................ | 384/537 |
| 2,718,415 A * | 9/1955 | Reynolds | ........................ | 403/343 |
| 2,794,691 A * | 6/1957 | Noe | ........................ | 384/495 |
| 3,082,048 A * | 3/1963 | Jordan et al. | ........................ | 384/541 |
| 3,236,572 A * | 2/1966 | White, Sr. | ........................ | 384/541 |
| 3,517,976 A * | 6/1970 | McAllister | ........................ | 384/541 |
| 3,588,208 A * | 6/1971 | Kane | ........................ | 384/541 |
| 3,901,568 A * | 8/1975 | Gadd et al. | ........................ | 384/589 |
| 3,985,458 A * | 10/1976 | Snyder, Jr. | ........................ | 403/111 |
| 4,124,258 A * | 11/1978 | Hafner | ........................ | 384/541 |
| 4,403,814 A * | 9/1983 | Koss et al. | ........................ | 384/541 |
| H242 H * | 4/1987 | Eng | ........................ | 29/525 |
| 4,854,747 A * | 8/1989 | Siebert et al. | ........................ | 384/447 |
| 5,791,787 A * | 8/1998 | Nisley | ........................ | 384/498 |
| 5,897,214 A * | 4/1999 | Nisley | ........................ | 384/537 |
| 6,092,956 A * | 7/2000 | Swinley | ........................ | 403/362 |
| 6,299,360 B1 * | 10/2001 | Dougherty et al. | ........................ | 384/584 |

(Continued)

OTHER PUBLICATIONS

Background Information (2 pages)(prior art before Dec. 17, 2012).

*Primary Examiner* — Alan B Waits
(74) *Attorney, Agent, or Firm* — Taft Stettinius & Hollister LLP; Stephen F. Rost

(57) ABSTRACT

A rotary apparatus comprises a first rotary component, a second rotary component, and an adaptor collar. The first rotary component has an axis of rotation. The first rotary component is positioned within the second rotary component such that the first and second rotary components are concentric with one another relative to an axis of rotation of the first rotary component. The adaptor collar is attached to and angularly surrounds the first rotary component and the second rotary component relative to the axis. The adaptor collar is keyed to the first rotary component. The rotary apparatus may be a driveline, in which case the first rotary component may be a drive shaft, and the second rotary component may be an inner race of a bearing.

19 Claims, 6 Drawing Sheets

(56) References Cited

U.S. PATENT DOCUMENTS

| | | | |
|---|---|---|---|
| 6,905,249 B2* | 6/2005 | Schill et al. | 384/541 |
| 8,177,436 B2* | 5/2012 | Horvat | 384/537 |
| 2004/0062464 A1* | 4/2004 | DeWachter et al. | 384/538 |
| 2004/0165802 A1* | 8/2004 | Schill et al. | 384/541 |
| 2006/0093251 A1* | 5/2006 | Casey et al. | 384/538 |
| 2007/0292067 A1* | 12/2007 | Ravindra et al. | 384/541 |

* cited by examiner

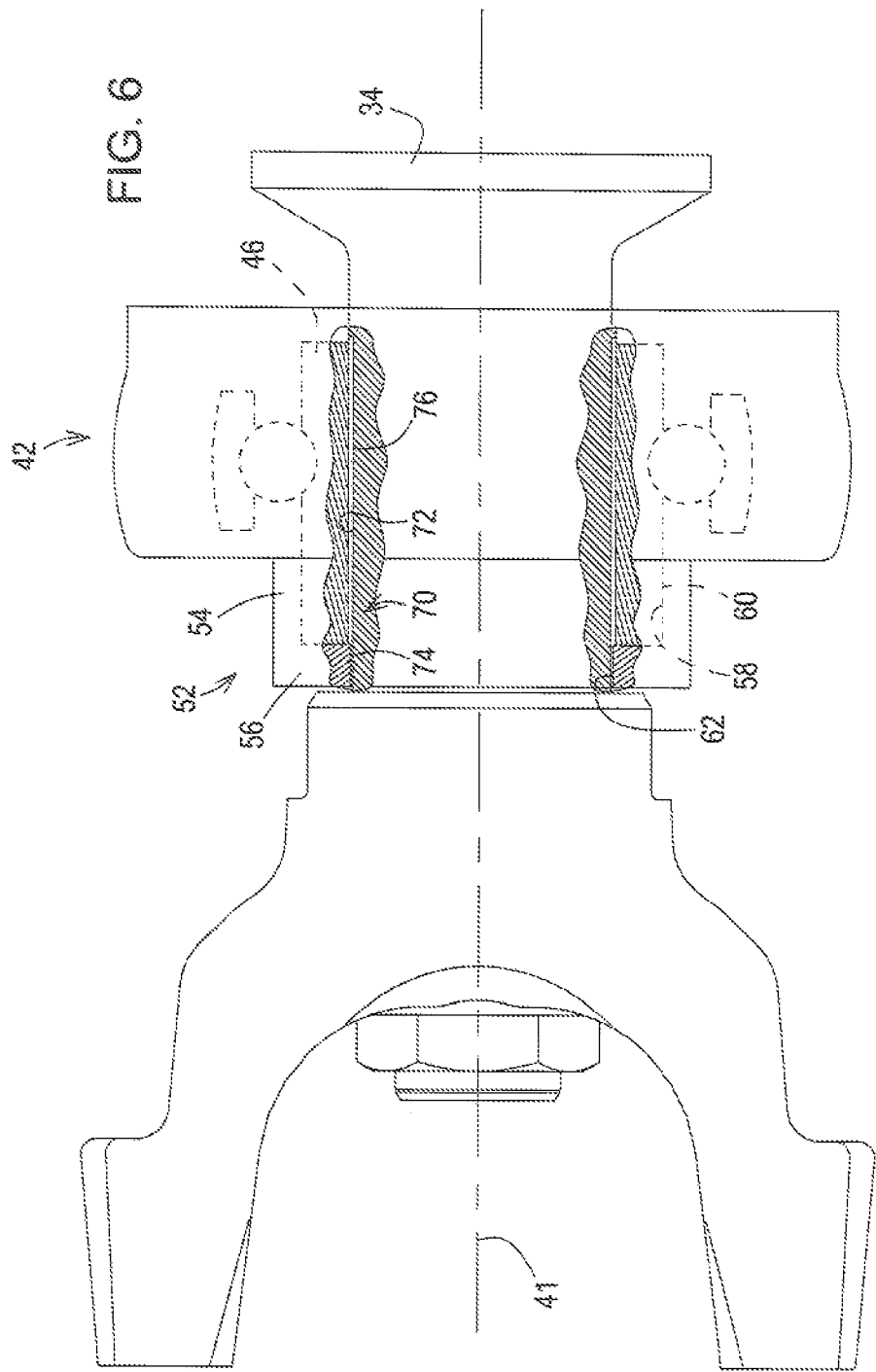

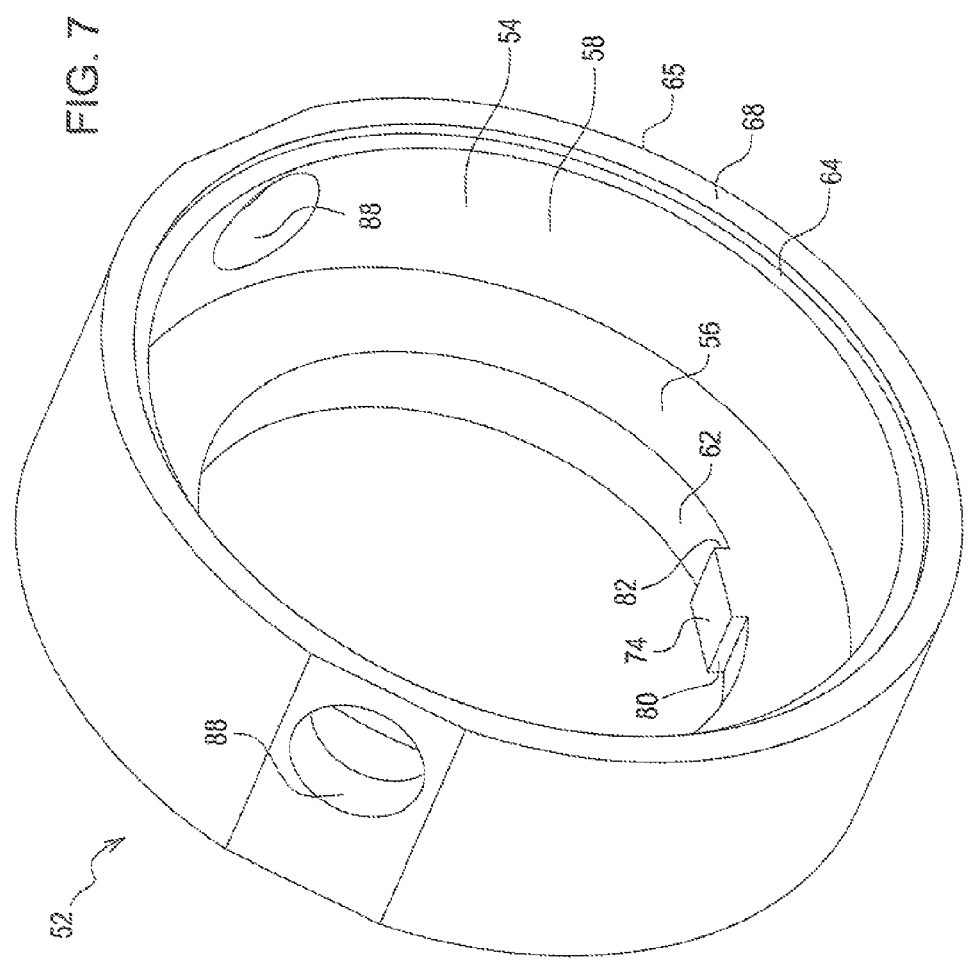

US 9,382,948 B1

ROTARY APPARATUS WITH ADAPTOR COLLAR

FIELD OF THE DISCLOSURE

The present disclosure relates to a rotary apparatus, such as, for example, a supported driveline.

SUMMARY OF THE DISCLOSURE

According to an aspect of the present disclosure, a rotary apparatus comprises a first rotary component, a second rotary component, and an adaptor collar. The first rotary component has an axis of rotation. The first rotary component is positioned within the second rotary component such that the first and second rotary components are concentric with one another relative to the axis. The adaptor collar is attached to and angularly surrounds the first rotary component and the second rotary component relative to the axis. The adaptor collar is keyed to the first rotary component so as to block relative rotation between the first rotary component and the second rotary component relative to the axis and to allow relative axial movement between the first rotary component and the second rotary component relative to the axis According to another aspect of the present disclosure, a driveline comprises a drive shaft, a bearing, and an adaptor collar. The drive shaft has an axis of rotation. The bearing comprises an inner race, an outer race, and rolling elements positioned between the inner race and the outer race. The drive shaft is positioned within the inner race. The adaptor collar is attached to and angularly surrounds the inner race and the drive shaft relative to the axis. The adaptor collar is keyed to the drive shaft so as to block relative rotation between the drive shaft and the inner race relative to the axis and to allow relative axial movement between the inner race and the drive shaft relative to the axis.

The above and other features will become apparent from the following description and the attached drawings.

BRIEF DESCRIPTION OF THE DRAWINGS

The detailed description of the drawing refers to the accompanying figures in which:

FIG. 6 is a sectional view representation similar to FIG. 3 but taken along lines 6-6 of FIG. 5 showing the key of the collar positioned in the keyway of the drive shaft allowing relative axial movement between the drive shaft and the collar and thus between the drive shaft and the inner race so as to prevent or otherwise minimize transferring load axially to the inner race relative to the axis; and FIG 7 is a perspective view of the collar.

DETAILED DESCRIPTION OF THE DRAWINGS

Figure 1:
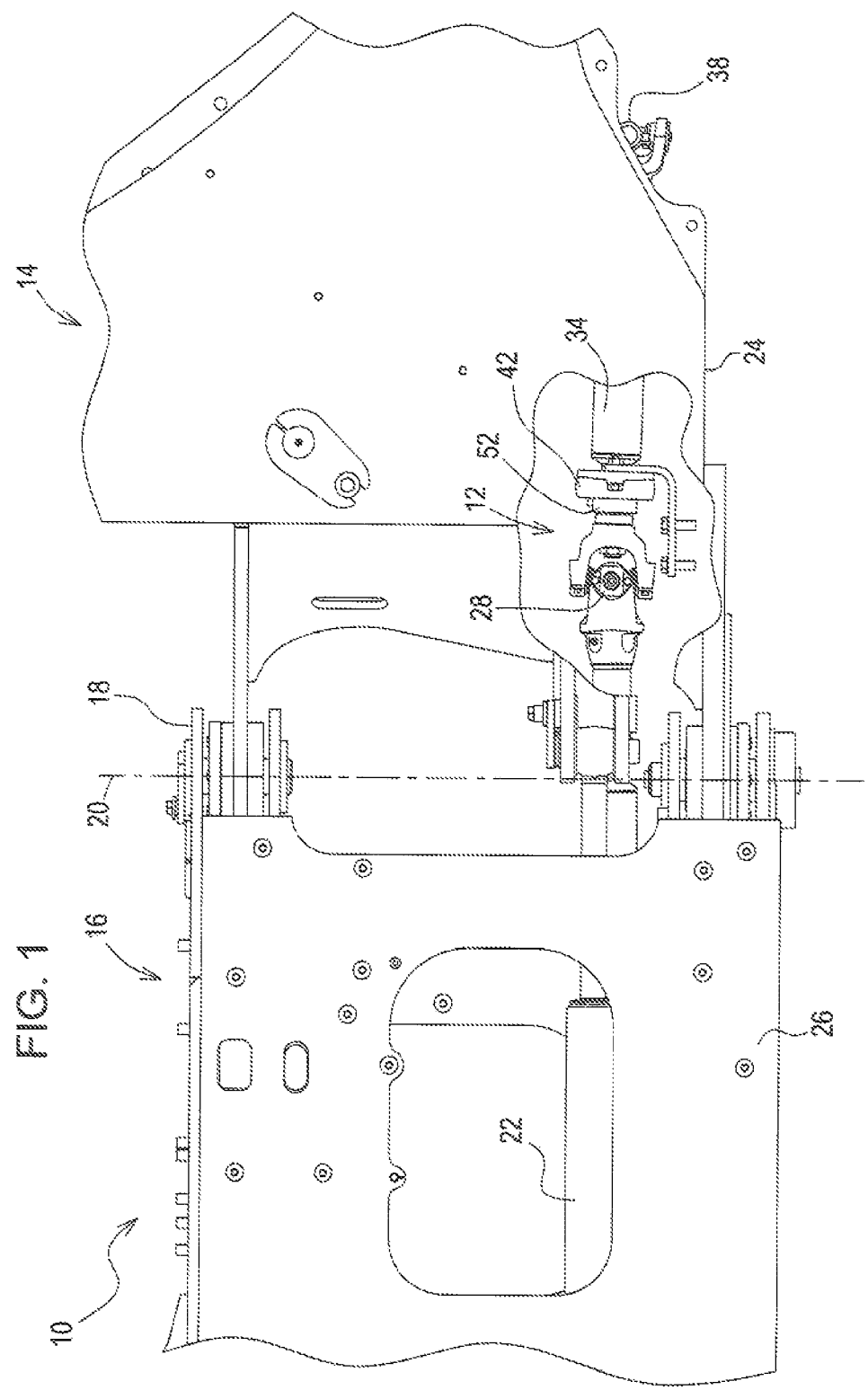
FIG. 1 is a side elevation view representation showing a simplified articulated vehicle comprising a supported driveline extending across the articulation joint.

Referring to FIG 1, an articulated vehicle 10 comprises a supported driveline 12. The vehicle 10 may be any type of articulated vehicle. It may be, for example, an articulated four wheel drive loader, portions of which are shown, for example, in FIGS. 1 and 2.

The vehicle 10 comprises a front section 14 and a rear section 16. The front and rear sections 14, 16 are articulated to one another at an articulation joint 18 for relative rotation between the sections 14, 16 about an articulation axis 20 in response to operation of a left steering cylinder and a right steering cylinder, the right steering cylinder shown, for example, at 22 in FIG. 1. The steering cylinders extend across the articulation joint 18 between the front frame 24 of the front section 14 and the rear frame 26 of the rear section 16 and are positioned on either side of the driveline 12.

Figure 2:
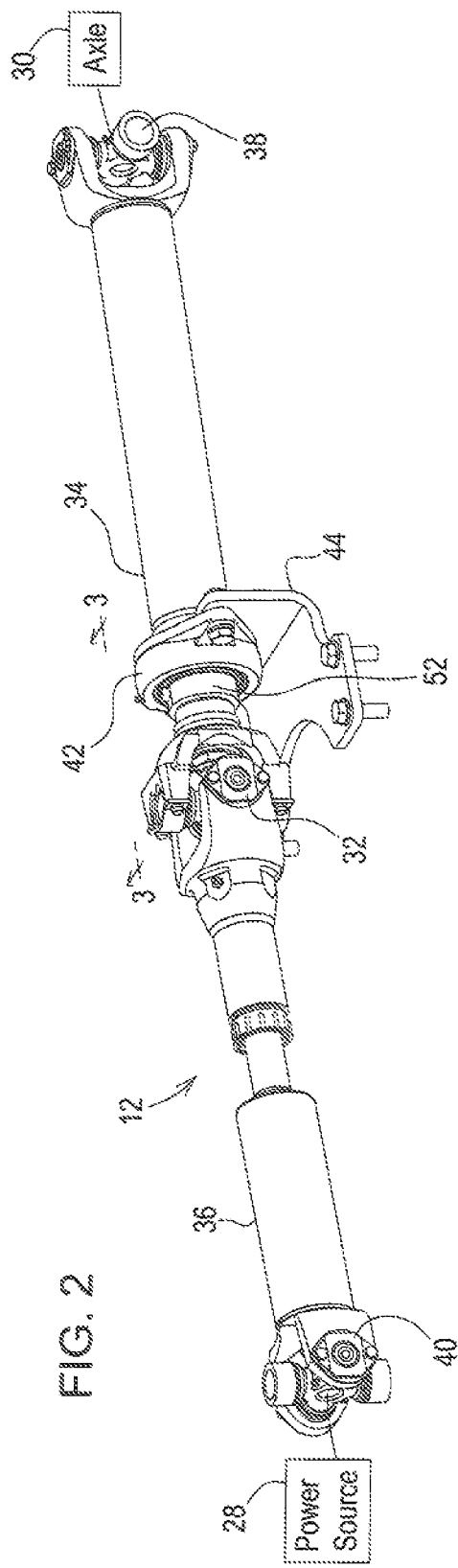
FIG. 2 is a perspective view representation showing the driveline supported on a frame of the vehicle by use of a bearing and a collar attached to the bearing.

Referring to FIGS. 1 and 2, the driveline 12 extends across the articulation joint 18 so as to interconnect a power source 28 of the rear section 16 and an axle 30 of the front section 14. The driveline 12 comprises a universal joint 32 to accommodate relative rotation between the front and rear sections 14, 16 about the articulation axis 20.

The driveline 12 comprises a first or front drive shaft 34 and a second or rear drive shaft 36. The front and rear drive shafts 34, 36 are attached to the universal joint 32. The front drive shaft 34, as well as the driveline 12, is attached to the axle 30 at a first or front mounting point 38 configured, for example, as a universal joint. The rear drive shaft 36, as well as the driveline 12, is attached to the power source 28 at a second or rear mounting point 40 configured, for example, as a universal joint. The front drive shaft 34 has an axis 41 that is central to the shaft 34 and, as such, is its axis of rotation. The rear drive shaft 36 is configured, for example, as a telescopic drive shaft allowing changes in its length in response to steering.

The driveline 12 is supported to prevent the driveline 12 from sagging and binding at the universal joint 32. The driveline 12 comprises a bearing 42 holding the front drive shaft 34 and attached to a mounting bracket 44 of the front frame 24 so as to support the drive shaft 34 and thus the driveline 12.

Figure 3:
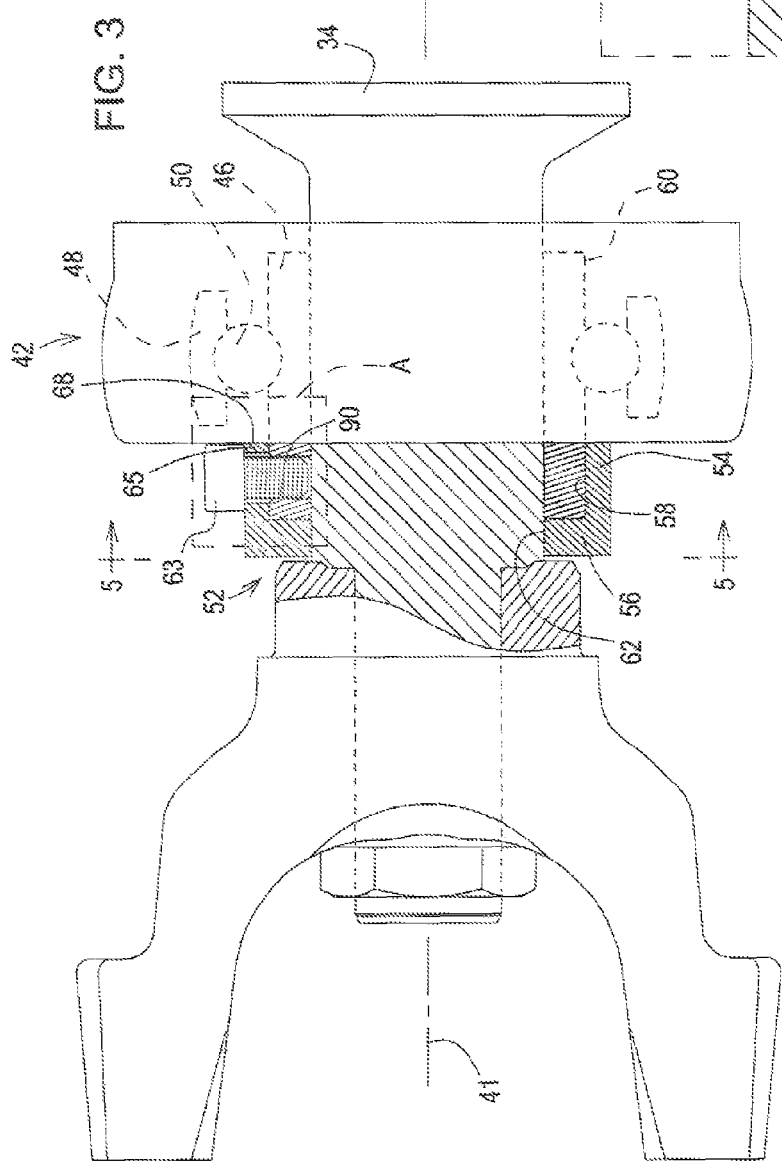
FIG. 3 is a sectional view representation taken along lines 3-3 of FIG. 2 showing the collar attached to an inner race of the bearing.

Referring to FIG. 3, the bearing 42 comprises an inner race 46, an outer race 48, and rolling elements 50 positioned between the inner race 46 and the outer race 48. The drive shaft 34 is positioned within the inner race 46. The bearing 42 may be configured, for example, as a ball bearing, in which case the roiling elements may be balls. The bearing 42 may be configured as any suitable type of bearing.

Referring to FIGS. 2-7, the driveline 12 comprises an adaptor collar 52 configured to attach the drive shaft 34 to the inner race 46 and thus the driveline 12 to the frame 24. The collar 52 is attached to and angularly surrounds the inner race 46 and the drive shaft 34 relative to the axis 41 of the front drive shaft 34, such that the collar 52, the inner race 46, and the drive shaft 34 are concentric with one another relative to the axis 41. The collar 52 is keyed to the drive shaft 34 so as to block relative rotation between the drive shaft 34 and the inner race 46 relative to the axis 41 and to allow relative axial movement between the inner race 46 and the drive shaft 34 relative to the axis 41. Relative rotation between the inner race 46 and the drive shaft 34 is blocked when the drive shaft 34 rotates in a first direction about the axis 41 and in a second direction about the axis 41 opposite to the first direction such that the collar 52 and the inner race 46 rotate with the drive shaft 34 in either direction. Nominally there is a slight angular clearance in the keyed connection between the drive shaft 34 and the inner race 46 relative to the axis 41 to accommodate the axial movement (e.g., 0.25 millimeter). As such, the drive shaft 34 and the inner race 46 are effectively locked rotationally to one another against relative rotation between one another relative to the axis 41. Relative axial movement between the inner race 46 and the drive shaft 34 is allowed so as to try to prevent or otherwise minimize axial loading on the bearing 42.

Referring to FIG. 3, the collar 52 comprises a first annular portion 54 and a second annular portion 56. The first and second annular portions 54, 56 are displaced from one another axially relative to the axis 41 and angularly surround the drive shaft 34 relative to the axis 41. The first annular portion 54 angularly surrounds and is fastened to the inner race 46 such that the inner race 46 is positioned radially between the first annular portion 54 and the drive shaft 34 relative to the axis 41. The second annular portion 56 is reduced in inner diameter relative to the first annular portion 54.

The collar 52 fits tightly to the inner race 46, thus centering it on the inner race 46. The first annular portion 54 comprises a first inside diameter surface 58 mating with and fitting tightly to an outside diameter surface 60 of the inner race 46 (e.g., line-to-line nominally). The second annular portion 56 comprises a second inside diameter surface 62 having an inside diameter smaller than an inside diameter of the first inside diameter surface 58.

Figure 5:
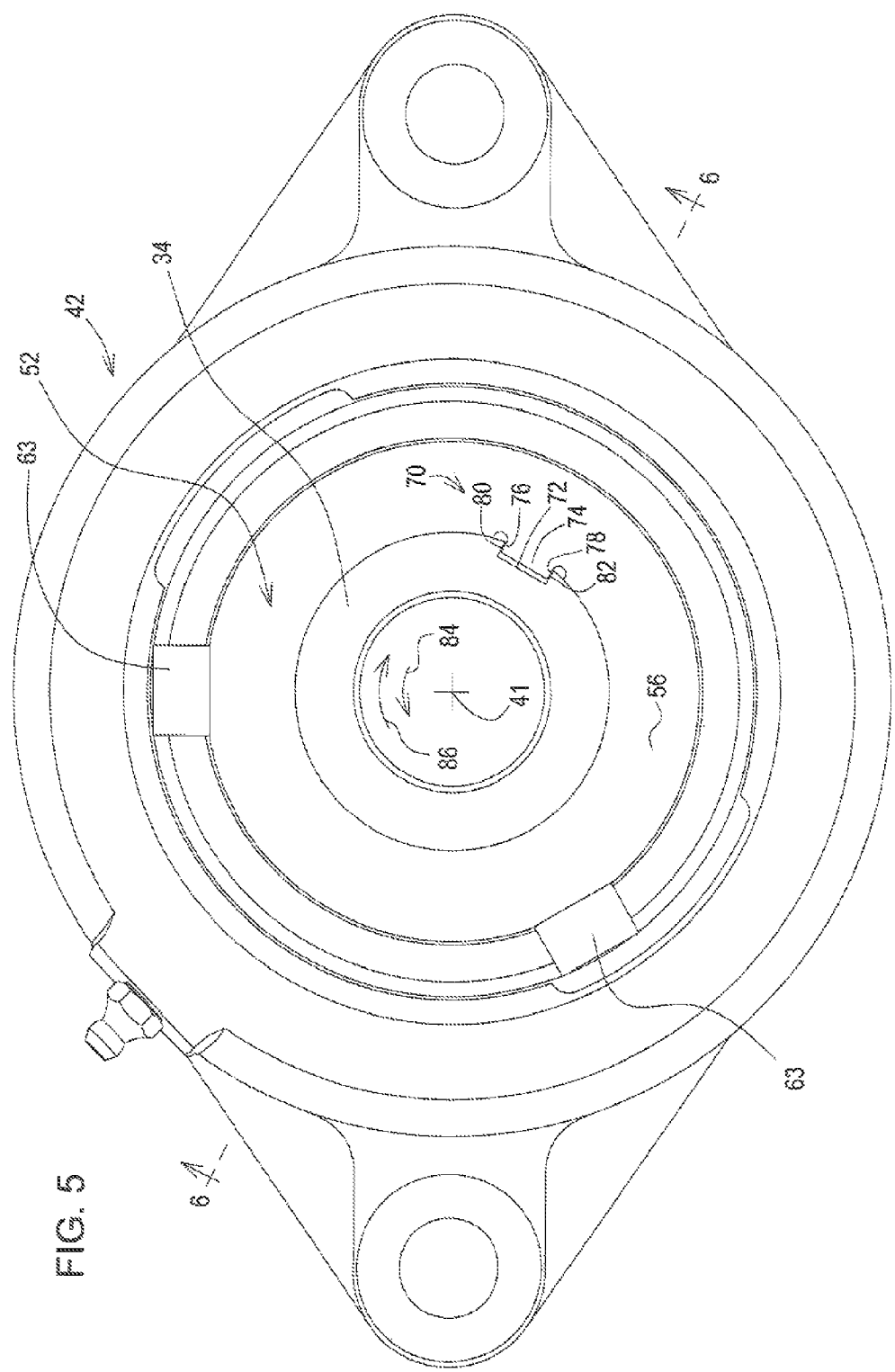
FIG. 5 is a sectional view representation taken along lines 5-5 of FIG. 3 showing a key of the collar extending into a keyway of the drive shaft effectively locking rotationally the drive shaft and the collar to one another and thus the drive shaft and the inner race to one another relative to an axis of rotation of the drive shaft.

Referring to FIGS. 3 and 5, the collar 52 is fastened to the inner race 46 so as to lock the collar 52 and the inner race 46 to one another against relative movement between one another such that they rotate with one another about the axis 41. The driveline 12 comprises at least one fastener 63 (e.g., capscrew) extending through the collar 52 into the inner race 46. The at least one fastener 63 extends through the first annular portion 54 into the inner race 46. For example, there are two such fasteners 63, spaced apart from one another relative to the axis 41 (e.g., 120 degrees) (FIG. 5).

Each fastener 63 may be configured, for example, as socket head capscrew. The fastener 63 extends through a respective clearance through-hole 88 of the first annular portion 54 of the collar 52 into a respective threaded through-hole 90 of the inner race 46 (the threaded through-hole being threaded therethrough) so as to be threaded to that threaded through-hole 90. The first annular portion 54 of the collar 52 is sufficiently radially thick to react against tightening of the fasteners 63.

Figure 4:
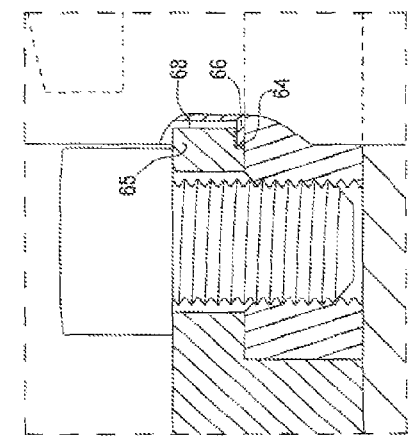
FIG. 4 is an enlarged view of region A of FIG. 3.

Referring to FIGS. 3 and 4, the first annular portion 54 comprises a counter-bore 64 at an end portion 65 of the collar 52. The counter-bore 64 provides a clearance between the collar 52 and a lip of a seal 66 of the bearing 42, the seal 66 provided to keep lubrication grease in the bearing 42. The counter-bore 64 is formed between an end surface 68 of the end portion 65 and the first inner diameter surface 58 so as to interconnect the end surface 68 and the first inner diameter surface 58.

Referring to FIGS. 5 and 6, the collar 52 and the drive shaft 34 cooperate to provide a key unit 70. The key unit 70 comprises a keyway 72 included in the collar 52 or the drive shaft 34 and extending axially relative to the axis 41 and a key 74 included in the other of the collar 52 or the drive shaft 34 and positioned in the keyway 72 such that the collar 52 is keyed to the drive shaft 34. For example, the drive shaft 34 comprises the keyway 72, and the collar 52 comprises the key 74.

The key 74 projects radially inwardly relative to the axis 41 from the second annular portion 56 into the keyway 72. The key 74 projects in this manner from the second inside diameter surface 62. Exemplarily, the key 74 is integrated into the second annular portion 56, although, in other embodiments, it could be a separate part attached to the second inside diameter surface.

The keyway 72 is configured, for example, as a groove extending axially relative to the axis 41 and formed in an outer diameter surface of the drive shaft 34. The key 74 is configured, for example, as a boss projecting radially relative to the axis 41 from the second inside diameter surface 62.

The keyway 72 and the key 74 are arranged for face-to-face contact with one another so that the drive shaft 34, the collar 52, and the inner race 46 rotate with one another. The keyway 72 is slightly angularly larger than the key 74 (e.g., 0.25 millimeter) to accommodate relative axial movement between the drive shaft 34 and the inner race 46, but respective surfaces of the key 74 and the keyway 72 contact one another in response to rotation of the driveline 12 in either direction about the axis 41.

The keyway 72 comprises a first flat surface 76 and a second flat surface 78, and the key 74 comprises a third flat surface 80 and a fourth flat surface 82. The first and second flat surfaces 76, 78 extending axially relative to the axis 41, and the third and fourth flat surfaces 80, 82 extending axially relative to the axis 41. The first and third flat surfaces 76, 80 are arranged to contact one another in face-to-face relation when the drive shaft 34 rotates in a first direction 84 relative to the axis 41. The second and fourth flat surfaces 78, 82 are arranged to contact one another in face-to-face relation when the drive shaft 34 rotates in a second direction 86 relative to the axis 41. Face-to-face contact between the key 74 and the keyway 72 distributes loading over the interfaces between the surfaces 76, 80 and the surfaces 78, 82, promoting minimizing surface pressure and the potential for wear at those interfaces, which may be particularly useful for vehicles that reverse the rotation direction of the driveline 12 frequently.

As alluded to herein, the fasteners 63 extend into the inner race 46. However, since the key 74 extends into the keyway 72, the fasteners 63 do not extend beyond the inner diameter surface of the inner race 46 and therefore do not extend into the keyway 72. As such, the fasteners 63 are not at risk for contacting the radially innermost surface of the keyway 72 (the "bottom" of the keyway) and restricting relative axial movement between the drive shaft 34 and the inner race 46.

During assembly, the collar 52 is fitted and fastened to the inner race 46. Since the fasteners 63 extend only into the inner race 46, there is no manual process for setting the radial depth of the fasteners 63 into the keyway 72. After the collar 52 is attached to the inner race 46 and before the yoke at the universal joint 32 is incorporated into the drive shaft 34, the sub-assembly of the collar 52 and the bearing 42 are oriented with the drive shaft 34 such that the key 74 and the keyway 72 are angularly aligned with one another. The sub-assembly is then slid onto the drive shaft 34 such that the key 74 is received in the keyway 72. The yoke can then be incorporated into the drive shaft 34.

The driveline 12 is an example of a rotary apparatus. The drive shaft 34 and the inner race 46 are examples of a first rotary component of the rotary apparatus and a second rotary component of the rotary apparatus, respectively. In such a case, the rotary apparatus may be described as follows: The rotary apparatus 12 comprises a first rotary component 34, a second rotary component 46, and an adaptor collar 52. The first rotary component 34 has an axis of rotation 41. The first rotary component 34 is positioned within the second rotary component 46 such that the first and second rotary components 34, 46 are concentric with one another relative to the axis 41. The adaptor collar 52 is attached to and angularly surrounds the first rotary component 34 and the second rotary component 46 relative to the axis 41. The adaptor collar 52 is keyed to the first rotary component 34 so as to lock the first rotary component 34 and the second rotary component 46 to one another against relative rotation between one another relative to the axis 41 and to allow relative axial movement between the first rotary component 34 and the second rotary component 46 relative to the axis 41.

Welds and threads (other than threads on a fastener 63 and a through-hole 90) have not been shown in the drawings for simplification of illustration, it being understood that they would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A rotary apparatus comprising
   a first rotary component, the first rotary component having an axis of rotation,
   a second rotary component, the first rotary component positioned within the second rotary component such that the first and second rotary components are concentric with one another relative to the axis,
   an adaptor collar defining a center, the adaptor collar attached to and circumscribing the first rotary component and the second rotary component relative to the axis, the adaptor collar comprising a first annular portion and a second annular portion, the second annular portion having a reduced inner diameter relative to the first annular portion, wherein the reduced inner diameter includes a first inner surface section defining a first distance from the center and a second inner surface section defining a second distance from the center different than the first distance;
   a plurality of setscrew holes passing through the outer and inner circumference of the first annular portion, the plurality of setscrew holes for securing the adaptor collar to the outer race; and
   a key defined by the second inner surface and extending radially relative to the axis of rotation so as to be received by a first rotary component keyway extending axially relative to the axis of the first rotary component; and
   further comprising at least one fastener configured to extend through one of the plurality of setscrew holes and into the inner race, wherein the second rotary component includes an inner diameter surface and the fastener includes a length insufficient to extend into contact with the drive shaft.

2. The rotary apparatus of claim 1, wherein the first rotary component is a drive shaft, and the second rotary component is an inner race.

3. The rotary apparatus of claim 1, wherein the second annular portion of the adaptor collar circumscribes the first rotary component and the second annular portion of the adaptor collar angularly surrounds the second annular component.

4. The rotary apparatus of claim 1, wherein the engagement of the key with the first rotary component keyway blocks relative rotation between the first rotary component and the second rotary component relative to the axis and to allow relative axial movement between the first rotary component and the second rotary component relative to the axis.

5. The rotary apparatus of claim 1 further comprising at least one fastener configured to extend through one of the plurality of setscrew holes and into the second rotary component, wherein the at least one fastener includes a length insufficient to extend into contact with the first rotary component.

6. The driveline of claim 5, wherein the second rotary component includes an inner diameter surface and the length of the at least one fastener is insufficient to extend beyond the inner diameter surface.

7. The driveline of claim 6, wherein the plurality of setscrew holes is axially misaligned with the key.

8. The driveline of claim 7, wherein the key is integrally formed into the second annular portion.

9. The driveline of claim 8, wherein the second rotary component includes threads configured to engage threads of the at least one fastener.

10. A driveline, comprising
    a drive shaft, the drive shaft having an axis of rotation,
    a bearing, the bearing comprising an inner race, an outer race, and rolling elements positioned between the inner race and the outer race, the drive shaft positioned within the inner race;
    an adaptor collar defining a center, the adaptor collar attached to and circumscribing the inner race and the drive shaft relative to the axis, the adaptor collar comprising a first annular portion and a second annular portion, the second annular portion having a reduced inner diameter relative to the first annular portion, wherein the reduced inner diameter includes a first inner surface section defining a first distance from the center and a second inner surface section defining a second distance from the center different than the first distance;
    a plurality of setscrew holes passing through the outer and inner circumference of the first annular portion, the plurality of setscrew holes for securing the adaptor collar to the inner race;
    a key defined by the second inner surface and extending radially from the second annular portion relative to the axis of the drive shaft, wherein the key comprises a size and shape as to be received by a drive shaft keyway; and
    further comprising at least one fastener configured to extend through one of the plurality of setscrew holes and into the inner race, wherein the bearing includes an inner diameter surface and the fastener includes a length insufficient to extend into contact with the drive shaft.

11. The driveline of claim 10, wherein the key is affixed to the second annular portion and extends axially relative to the drive shaft, the key extending toward the drive shaft axis of rotation as to be received by the drive shaft keyway.

12. The driveline of claim 11, wherein the keyway comprises a first flat surface and a second flat surface, the key comprises a third flat surface and a fourth flat surface, the first and third flat surfaces are arranged to contact one another in face-to-face relation when the drive shaft rotates in a first direction relative to the axis, and the second and fourth flat surfaces are arranged to contact one another in face-to-face relation when the drive shaft rotates in a second direction relative to the axis.

13. The driveline of claim 10, wherein the first and second annular portions are displaced from one another axially relative to the axis and circumscribing the drive shaft relative to the axis, the first annular portion angularly surrounds and is fastened to the inner race such that the inner race is positioned radially between the first annular portion and the drive shaft relative to the axis, the second annular portion is reduced in inner diameter relative to the first annular portion, the plurality of setscrew holes passing through the outer and inner circumference of the first annular portion, the plurality of setscrew holes for securing the adaptor collar to the outer race, the drive shaft comprises the keyway, the adaptor collar comprises the key, and the key extending axially relative to the axis of the drive shaft from the second annular portion into the keyway.

14. The driveline of claim 13, wherein the first annular portion comprises a first inside diameter surface mating with an outside diameter surface of the inner race, wherein the key projects into the keyway.

15. The driveline of claim 13, wherein the first annular portion comprises a counter-bore relative to the second annular portion of the adapter collar, providing a clearance between the adaptor collar and a seal of the bearing.

16. The driveline of claim 10, wherein the inner race includes an inner diameter surface and the length of the fastener is insufficient to extend beyond the inner diameter surface.

17. The driveline of claim 16, wherein the plurality of setscrew holes is axially misaligned with the key.

18. The driveline of claim 17, wherein the key is integrally formed into the second annular portion.

19. The driveline of claim 18, wherein the inner race includes threads configured to engage threads of the at least one fastener.

* * * * *